United States Patent [19]

Gomi et al.

[11] Patent Number: 4,657,782
[45] Date of Patent: Apr. 14, 1987

[54] METHOD OF FORMING A RARE EARTH-IRON-GARNET VERTICALLY MAGNETIZED FILM

[75] Inventors: Manabu Gomi, Ichikawa; Masanori Abe, Nishimine, both of Japan

[73] Assignee: Nippon Sheet Glass Co., Ltd., Osaka, Japan

[21] Appl. No.: 840,875

[22] Filed: Mar. 18, 1986

[30] Foreign Application Priority Data

Mar. 27, 1985 [JP] Japan ................... 60-62737

[51] Int. Cl.⁴ .......................................... H01F 10/02
[52] U.S. Cl. ................................... 427/130; 427/128
[58] Field of Search .......................... 427/127-132, 427/48; 428/900, 694

[56] References Cited

U.S. PATENT DOCUMENTS 3,745,046 7/1973 Mee et al. .................. 117/235

Primary Examiner—Bernard D. Pianalto
Attorney, Agent, or Firm—Woodcock Washburn Kurtz Mackiewicz & Norris

[57] ABSTRACT

In a method of forming a rare earth-iron-garnet vertically magnetized film by applying a coating solution containing $Fe^{3+}$ and rare earth ions on an amphorous substrate to form a coating film, and firing the coating film to cause thermal decomposition and crystallization of the film to form a rare earth-iron-garnet film, the coating solution contains $Bi^{3+}$ and ions substitutable for $Fe^{3+}$ in the garnet.

9 Claims, 14 Drawing Figures

METHOD OF FORMING A RARE EARTH-IRON-GARNET VERTICALLY MAGNETIZED FILM

BACKGROUND OF THE INVENTION

1. Field of the Invention

The present invention relates to a method of forming a rare earth-iron-garnet vertically magnetized film and, more particularly, to a method using a chemical process for forming a rare earth-iron-garnet vertically magnetized film having magnetic properties usable for an optomagnetic recording medium on any substrate.

2. Description of the Prior Art

In a known conventional chemical method of forming a rare earth-iron-garnet film, a concentrated solution containing Gd and Fe ions in an ion ratio of 3:5 is diluted with ethyl alcohol to prepare a coating solution. After the coating solution is spin-coated on an yttrium aluminum garnet (YAG) substrate, the coated film is dried at 300° to 500° C. and then heated in air at 650° C. so as to epitaxially grow $Gd_3Fe_5O_{12}$ on the YAG substrate. This method thus comprises a chemical process to form a rare earth-iron-garnet film.

This conventional chemical method has an advantage that a rare earth-iron-garnet film of single crystals having excellent magnetic properties can be formed on a single crystal substrate such as a YAG or GGG (gadolinium gallium garnet) substrate. In such a conventional method, however, a film having vertical magnetic properties can be formed only on a single crystal substrate as described above, and a film having in-plane magnetic properties can only be manufactured if an amorphous substrate such as a glass substrate is used.

The fact that substrate materials for allowing formation of vertical magnetized films are limited to single crystals means that the industrialization is difficult owing to poor productivity and high cost of single crystal substrates.

SUMMARY OF THE INVENTION

Accordingly, it is an object of the present invention to provide a method of forming a rare earth-iron-garnet vertically magnetized film, in which a rare earth-iron-garnet film having vertical magnetic properties can be formed on a substrate of not only single crystal but also polycrystalline or amorphous material.

It is another object of the present invention to provide a method of forming a rare earth-iron-garnet vertical magnetized film which can be used as a recording medium for optomagnetic memory.

It is still another object of the present invention to provide a method of forming a rare earth-iron-garnet vertically magnetized film which can be used as an optical switch array.

The above and other objects are achieved by the present invention as follows. According to the present invention, in a method of forming a rare earth-iron-garnet vertically magnetized film by applying a coating solution containing $Fe^{3+}$ and rare earth ions on a substrate to form a coating film and then by firing the coating film to cause thermal decomposition and crystallization of the film to form a rare earth-iron-garnet film, the coating solution contains $Bi^{3+}$ and ions substitutable for $Fe^{3+}$ in the garnet.

Other and further objects, features, and advantages of the invention will appear more fully from the following description.

DETAILED DESCRIPTION OF THE PREFERRED EMBODIMENTS

According to the present invention, ions which can substitute for $Fe^{3+}$ in the garnet may include $Ni^{2+}$, $Co^{2+}$, $Co^{3+}$, $Mn^{3+}$, $Cr^{3+}$, $Al^{3+}$, $Cu^{2+}$, $Zn^{2+}$, $Sc^{3+}$, $Hf^{4+}$, $V^{5+}$, $Ti^{4+}$, $Mo^{4+}$, $Sn^{4+}$, $In^{3+}$, $Rh^{3+}$, $Ru^{3+}$, $Zr^{4+}$, $Ge^{4+}$, $Si^{4+}$, $Li^+$, and combinations thereof such as $(Co^{3+}+Al^{3+})$ or $(2Co^{2+}+V^{5+})$ Among the ions enumerated above, nonmagnetic ions are preferred since they decrease saturation magnetization.

In the present invention, the coating solution contains $Bi^{3+}$ and ions substitutable for $Fe^{3+}$ in the garnet. In addition, the composition of the coating solution must be adapted to form a rare earth-iron-garnet film by firing the coating film. If this condition is satisfied, the solution need not have good charge matching. For example, a solution that contains $Fe^{3+}$; rare earth ions {ions of Y, La, Ce, Pr, Nd, Pm, Sm, Eu, Gd, Tb, Dy, Ho, Er, Tm, Yb, and Lu} (to be referred to as $Re^{3+}$ ions hereinafter); $Bi^{3+}$; $A^{3+}$, $B^{2+}$, $C^{4+}$, and $E^{5+}$ type ions which can substitute for $Fe^{3+}$ in the garnet {$Al^{3+}$, $Ga^{3+}$, $Cr^{3+}$, $Co^{3+}$ and the like; $Co^{2+}$, $Fe^{2+}$, $Cu^{2+}$ and the like; $Si^{4+}$, $Ge^{4+}$, $Sn^{4+}$, $Pb^{4+}$ and the like; $V^{5+}$, $Nb^{5+}$ and the like; and mixtures thereof}; and $D^{2+}$ ions which can substitute for $Re^{3+}$ ions {$Pb^{2+}$, $Co^{2+}$, $Mg^{2+}$ and the like; and mixtures thereof} in amounts to satisfy the following conditions is required:

$$(Re^{3+})+(Bi^{3+})+(D^{2+})+(Fe^{3+}) \\ +(A^{3+})+(B^{2+})+(C^{4+})+(E^{5+}) = 8 \qquad (1)$$

$$4.5 \leq (Fe^{3+})+(A^{3+})+(B^{2+})+(C^{4+})+(E^{5+}) \leq 6.0 \qquad (2)$$

$$2.0 \leq (Re^{3+})+(Bi^{3+})+(D^{2+}) \leq 3.5 \qquad (3)$$

$$0.5 \leq (Re^{3+}) \leq 3.0 \qquad (4)$$

$$0.25 \leq (Bi^{3+}) \leq 2.5 \qquad (5)$$

$$3.0 \leq (Fe^{3+}) \leq 5.0 \qquad (6)$$

$$0.3 \leq (A^{3+})+(B^{2+})+(C^{4+})+(E^{5+}) \leq 2.0 \qquad (7)$$

(wherein $(Bi^{3+})$, $(Fe^{3+})$ and the like are relative values of cations such as $Bi^{3+}$, $Fe^{3+}$ and the like contained in the coating solution).

Among compositions satisfying the above conditions, in order to obtain iron-garnet films having better magnetic properties, those which further satisfy the following conditions are preferable:

$$5.0 \leq (Fe^{3+})+(A^{3+})+(B^{2+})+(C^{4+})+(E^{5+}) \leq 5.5 \qquad (8)$$

$$2.5 \leq (Re^{3+})+(Bi^{3+})+(D^{2+}) \leq 3.0 \qquad (9)$$

$$0.9 \leq (Re^{3+}) \leq 1.5 \quad (10)$$

$$1.5 \leq (Bi^{3+}) + (D^{2+}) \leq 2.1 \quad (11)$$

$$3.0 \leq (Fe^{3+}) \leq 4.0 \quad (12)$$

$$1.0 \leq (A^{3+}) + (B^{2+}) + (C^{4+}) + (E^{5+}) \leq 2.0 \quad (13)$$

In addition, among compositions satisfying conditions (1) to (13), in order to provide an iron-garnet structure having good charge sign matching, compositions which further satisfy the following conditions are preferable:

$$(Fe^{3+}) + (A^{3+}) + (B^{2+}) + (C^{4+}) + (E^{5+}) = 5.0 \quad (14)$$

$$(Re^{3+}) + (Bi^{3+}) + (D^{2+}) = 3.0 \quad (15)$$

$$(B^{2+}) + (D^{2+}) = (C^{4+}) + (\tfrac{1}{2})(E^{5+}) \quad (16)$$

The $Bi^{3+}$ is preferably contained in a ratio of 0.25 or more in term ($Bi^{3+}$) of the above condition (1). This is because a vertically magnetized film is hard to obtain when the ratio of $Bi^{3+}$ is less than 0.25. Ions which can substitute for $Fe^{3+}$ in the garnet are preferably contained in a ratio of 0.3 or more in terms $(A^{3+}) + (B^{2+}) + (C^{4+}) + (E^{5+})$ satisfying the condition (1). This is also because a vertically magnetized film is hard to obtain when the ratio of this type of ion is less than 0.3.

As a supply source of metal ions for the coating solution, various salts such as nitrates, sulfates, and acetates can be used. Nitrates are preferred since they have low thermal decomposition points, are easily soluble in water, and are easy to handle.

The solution can be an aqueous solution, an organic solvent solution, or a mixture thereof. As an aqueous solution, an acidic solution allowing high solubility of a salt selected from those enumerated above is preferably used. One of the acids enumerated above is preferably used as an acid for adjusting the pH of the solution. Examples of such a coating solution include concentrated nitric acid solutions of nitrate and solutions obtained by adding thereto an organic solvent such as ethyl alcohol, isopropyl alcohol, acetone, benzene or toluene. When such a solution is used, a uniform coating film can be easily obtained. When the concentration of the above-mentioned coating solution mixture consisting of an organic solvent solution and an aqueous solution is less than 0.01 moles/l in terms of the cation concentration, the thickness of the coating film is too small and a uniform film cannot be obtained. When the concentration is higher than 0.7 moles/l, the solution becomes unstable and cannot be easily coated uniformly on a substrate. In view of this, the concentration of the solution preferably falls within a range of 0.01 to 0.7 moles/l. More preferably, the concentration of the solution falls within a range of 0.05 to 0.5 moles/l and is normally selected to fall within a range of 0.1 to 0.3 moles/l. The concentration of the above-mentioned concentrated solution obtained by dissolving a nitrate in nitric acid (the nitric acid having 0.7 N or more) is preferably 0.01 to 1.5 moles/l in terms of the cation concentration in the solution. This is for the following reason: when the concentration is lower than 0.01 moles/l, the coating film becomes too thin and a uniform film is hard to obtain; on the other hand, if the concentration is higher than 1.5 moles/l, stability of the solution is degraded. The concentration of the solution is particularly preferable to 0.7 to 1.0 moles/l. The cation concentration in the solution is preferably high since then the thickness of the coating film obtained by one coating process is increased. An aqueous nitric acid solution obtained by dissolving a nitrate in nitric acid as described above can provide a cation concentration which allows formation of a coating film having a maximum thickness of about 400 nm and normally about 300 nm with a single coating process.

In the present invention, a single crystal substrate such as a YAG or GGG substrate, a polycrystalline or amorphous substrate, or other composite substrate can be used. It is to be noted that, since an amorphous substrates such as a glass substrate which is transparent and has excellent producibility can be used, the invention has a great advantage that the application to optomagnetic memories and the like is facilitated.

As a substrate, one having the coefficient of thermal expansion of 30 to $100 \times 10^{-7}/°$ C. is preferably used since such a substrate has only a small difference in the coefficient of thermal expansion from that of a rare earth-iron-garnet film formed thereon and thus, little cracking in the film will be caused.

As a method of applying the coating solution on the substrate, a conventional coating method such as dipping, spin coating or spraying can be adopted.

In order to dry the coating film, the substrate surface is preferably kept at 400° C. or lower in order to form a film with less pores or the like. The firing temperature for the coating film is selected to fall within a range of 400° to 800° C.

A thick coating film can be formed by repeatedly applying a coating solution on the substrate and drying the coating film. This method is preferred to obtain a uniform thick film.

The substrate is preferably cleaned to remove any dust or oil components before coating with the coating solution, in order to obtain good adhesion with the coating film. Alternatively, after normal cleaning, slight etching can be performed by plasma etching. This is preferred since it improves adhesion of the film to the substrate.

The firing time after formation of the coating film is preferably short for high productivity and low energy consumption. The firing time is preferably not more than 5 hours.

According to the present invention, the coating solution contains $Bi^{3+}$ and ions which can substitute for $Fe^{3+}$ in the garnet. When the coating solution contains $Bi^{3+}$, rare earth ions in the garnet structure of the rare earth-iron-garnet film formed upon firing are replaced with $Bi^{3+}$. When this replacement occurs, the Faraday rotational angle $\theta f$ can be increased and the crystallization temperature of the rare earth-iron-garnet film can be decreased without significantly increasing the light absorption coefficient $\alpha$ thereof.

When $Fe^{3+}$ in the rare earth-iron-garnet is replaced with another type of ion, it achieves the main functions of (1) reducing the Curie temperature and (2) reducing the saturation magnetization. In particular, $Al^{3+}$ also has a function of reducing the light absorption coefficient.

As a combination effect obtained since the coating solution of the present invention contains (1) $Bi^{3+}$ and (2) ions which can substitute for $Fe^{3+}$ in the garnet, even if a glass plate is used as a substrate, a rare earth-iron-garnet film having vertical magnetic properties irrespective of its polycrystallinity can be formed because of strains caused by the difference in the thermal expansion coefficients between the substrate and the magnetic film and of the strain-induced magnetic anisotropy.

According to the present invention, since the coating solution contains $Bi^{3+}$ and ions which can substitute for $Fe^{3+}$ in the garnet, a rare earth-iron-garnet having excellent surface smoothness and vertical magnetic properties can be formed even on an amorphous substrate such as a glass plate.

With the excellent magnetic properties and surface smoothness, the rare earth-iron-garnet film of the present invention is therefore suitable for use as a magnetic recording medium in an optomagnetic memory. A rare earth-iron-garnet formed by the method of the present invention is uniform over a large area and can therefore be used as an optical switch array or the like.

EXAMPLE 1

Ferric nitrate, yttrium nitrate, bismuth nitrate and aluminum nitrate were weighed in molar ratios of 3.8:2.0:1.0:1.2 to obtain a total mixture amount of 0.1 moles. These nitrates were placed in a beaker, distilled water was added to a total amount of about 25 ml, and 30 ml of concentrated nitric acid were further added thereto. The solution was then heated to completely dissolve the nitrates. After cooling the solution, ethyl alcohol was added to a total amount of 0.5 l. The resultant solution having a nitrate concentration of 0.2 moles/l was provided as a coating solution.

A 3 cm square glass plate ("7059" available from Corning Glass Works, U.S.A.) of 1 mm thickness was cleaned well and the glass surface was plasma-etched for 5 minutes. After the glass plate was fixed on a spinner, several droplets of the above coating solution were dripped thereonto. The glass plate was then rotated at about 2,000 rpm for 60 seconds. After completing coating, a high-power infrared lamp disposed above the spinner was turned on for several minutes to heat the glass plate so as to evaporate the major part of alcohol and water remaining in the coating film. The substrate surface temperature was then about 300° C.

The thickness of the rare earth-iron-garnet film after firing the coating film obtained in this manner was about 50 to 100 nm.

In this Example, the applying/drying process was repeated five times for a single glass plate so as to obtain a film thickness of about 0.3 μm after firing.

The glass plate having the coating film thereon was held in a furnace at 670° C. for 3 hours to cause thermal decomposition and crystallization of the coating film. Thereafter, the glass plate was cooled.

Figure 6:
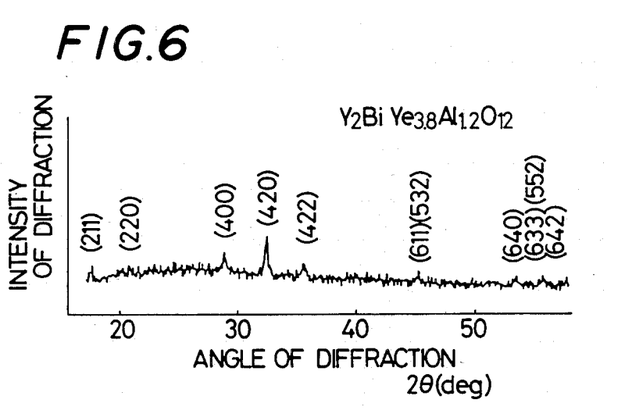
FIG. 6 is a chart of X-ray diffraction of the rare earth-iron-garnet film obtained in Example 1.

When the obtained crystalline film was subjected to X-ray diffraction, the results shown in FIG. 6 were obtained. It is seen from FIG. 6 that the obtained film was a polycrystalline rare earth-iron-garnet film having no anisotropy.

Figure 1:
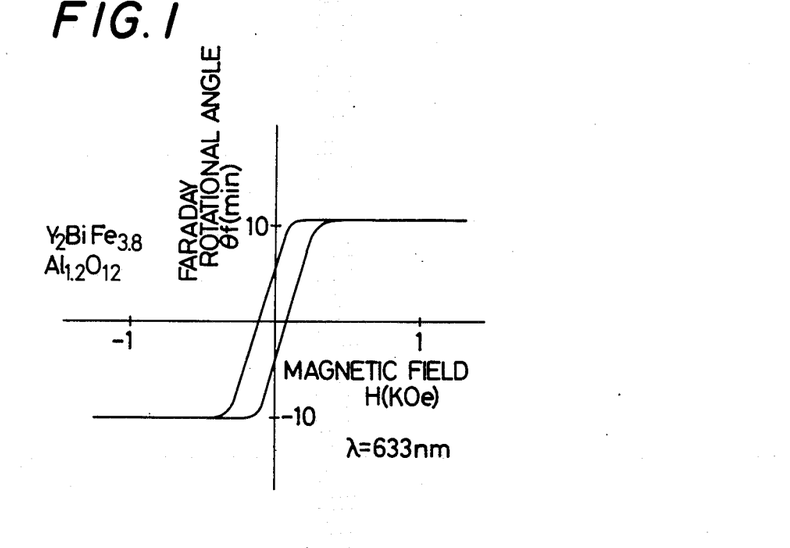
FIGS. 1 to 5 are graphs showing optical hysteresis characteristics of rare earth-iron-garnet films formed in Examples 1 to 5.

When the Faraday rotational angle $\theta l$ of light having the wavelength of 633 nm for a magnetic field H in a direction normal to the surface of the obtained film was measured, the results shown in FIG. 1 were obtained. It is seen from FIG. 1 that the rare earth-iron-garnet film has vertical magnetic properties even though it is polycrystalline.

The obtained film did not have any cracks and the film surface was smooth. Observation with an electron microscope revealed that the average size of the rare earth-iron-garnet crystals is about 60 nm.

The rare earth-iron-garnet film was assumed to have a chemical formula $Y_2BiFe_{3.8}Al_{1.2}O_{12}$ in accordance with the composition of the coating solution used and the results of X-ray diffraction.

EXAMPLE 2

Ferric nitrate, gadolinium nitrate, bismuth nitrate and aluminum nitrate were weighed in a molar ratio of 3.8:1.0:2.0:1.2 to provide a total amount of 0.1 moles. A coating solution was prepared, applied and fired following the same procedures as that in Example 1 so as to form a rare earth-iron-garnet film on a glass plate.

The obtained film was a polycrystalline film which had the smooth surface and no anisotropy, as in Example 1. The Faraday rotational angle $\theta f$ of light having the wavelength of 633 nm for a magnetic field H in a direction normal to the surface of the film (assumed to have a chemical formula $GdBi_2Fe_{3.8}Al_{1.2}O_{12}$) was measured following the same procedures as that in Example 1. (This measurement will be referred to as "measurement of optical hysteresis characteristics" hereinafter). The obtained results are shown in FIG. 2.

Figure 2:
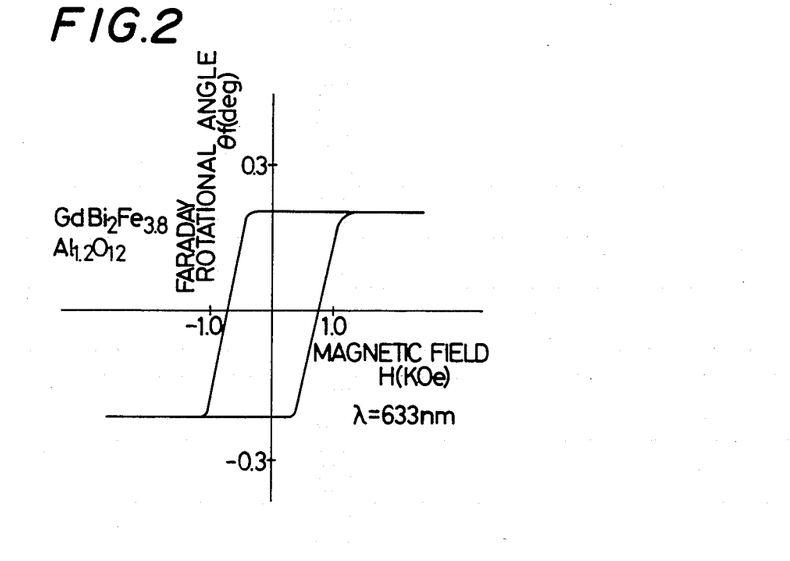

It is seen from FIG. 2 that the film obtained in Example 2 has magnetic properties providing a squareness ratio of 100%.

EXAMPLES 3 & 4

Ferric nitrate, yttrium nitrate, bismuth nitrate and aluminum nitrate were weighed in a molar ratio of 3.8:1.5:1.5:1.2 and 3.8:1:1.5:1.2, respectively, to provide respective total amounts of 0.1 moles. Each mixture was used to form an iron-garnet film on a glass plate following the same procedures as that in Example 1.

Figure 3:
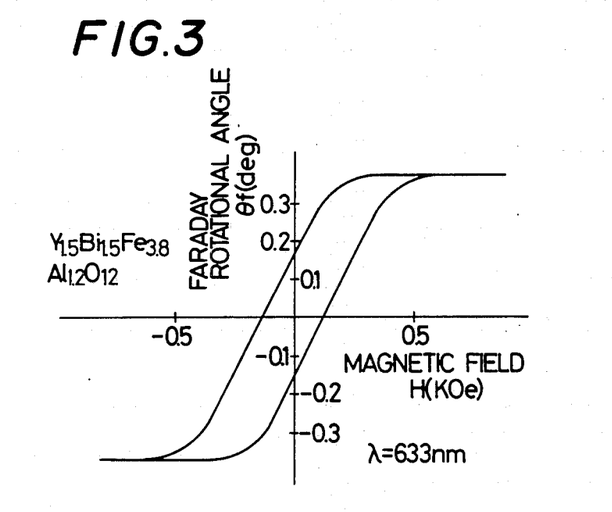
Figure 4:
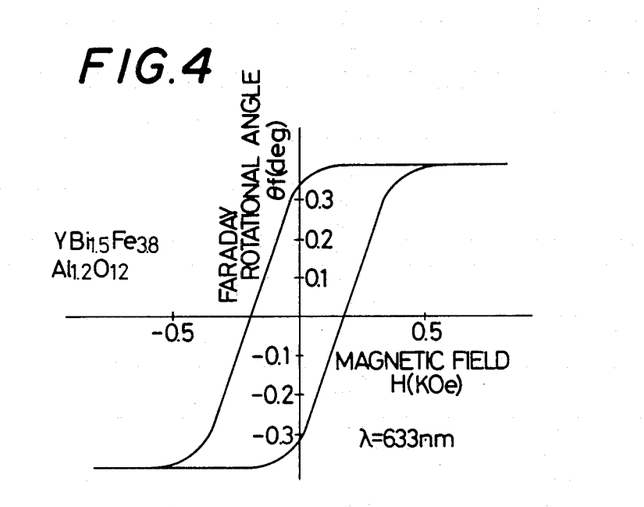

The optical hysteresis characteristics of the obtained polycrystalline garnet films having the smooth surfaces and assumed to have chemical formulas $Y_{1.5}Bi_{1.5}Fe_{3.8}Al_{1.2}O_{12}$ and $YBi_{1.5}Fe_{3.8}Al_{1.2}O_{12}$ were measured following the same procedures as that in Example 1, and the obtained results are respectively shown in FIGS. 3 and 4.

It is seen from FIGS. 3 and 4 that the obtained films have vertical magnetic properties.

EXAMPLE 5

Ferric nitrate, gadolinium nitrate, bismuth nitrate and aluminum nitrate were weighed in a molar ratio of 3.8:2.0:1.0:1.2 to provide a total amount of 0.1 moles. An iron-garnet film was formed on a glass plate following the same procedures as that in Example 1.

Figure 5:
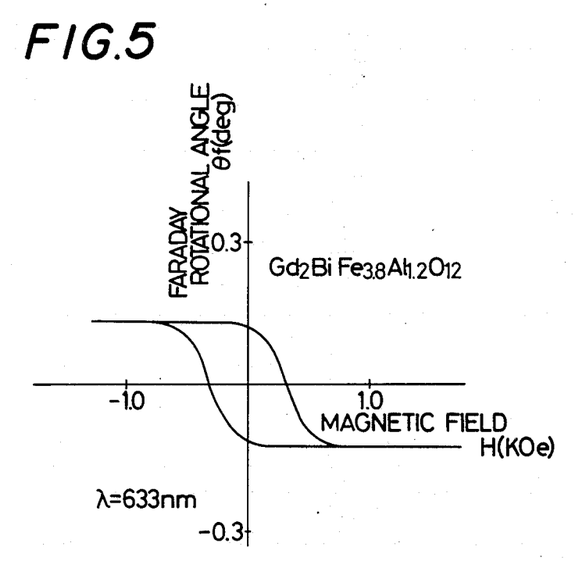

The optical hysteresis characteristics of the obtained polycrystalline garnet film having the smooth surface and assumed to have a chemical formula $Gd_2BiFe_{3.8}Al_{1.2}O_{12}$ were measured following the same procedures as that in Example 1, and the obtained results are shown in FIG. 5. It is seen from FIG. 5 that the film in Example 5 also has vertical magnetic properties.

EXAMPLE 6

One liter of the coating solution having the same composition as that in Example 1 was prepared. A 10 cm square glass plate having the thickness of 2 mm ("7059" available from Corning Glass Works, U.S.A.) was dipped in the solution and was pulled at the rate of 10 cm per minute.

In such a dipping method as described above, in order to obtain a uniform film, it is very important to pull the glass plate (substrate) at a constant rate (several centimeters/min to several tens of centimeters/min). In view of this, in this Example, the pulling rate was kept constant.

After the glass plate was pulled from the solution, it was heated for several minutes by an infrared heater arranged at a side of the plate such that the surface of the glass plate was heated to about 300° C.

Upon a single cycle of pulling, drying, and firing (to be described below), a rare earth-iron-garnet film having the thickness of about 150 nm was obtained. In this example, the cycle of coating and drying was repeated twice, and the glass plate with the film formed thereon was fired in a furnace at 670° C. for 3 hours.

The film obtained by this heat-treatment was very uniform and smooth, like that of Example 1 (note that the film at the lowermost end of the plate was slightly thicker). Electron microscope observation of the film revealed that the film had a polycrystalline structure having an average size of 60 nm as that in Example 1 and that the result of X-ray diffraction and optical hysteresis characteristics of the film are equivalent to those shown in FIGS. 6 and 1, respectively.

EXAMPLE 7

Yttrium nitrate, bismuth nitrate, ferric nitrate and aluminum nitrate were weighed in molar ratios of (a) 3.0:0:5.0:0, (b) 3.0:0:3.8:1.2, (c) 2.75:0.25:5.0:0, (d) 2.5:0.5:5.0:0, (e) 2.0:1.0:5.0:0, (1) 2.75:0.25:4.7:0.3, (2) 2.75:0.25:4.5:0.5, (3) 2.75:0.25:3.8:1.2, and (4) 2.5:0.5:3.8:1.2 to provide total amounts of 0.1 moles, respectively. In addition, yttrium nitrate, bismuth nitrate, ferric nitrate and gallium nitrate were weighed in molar ratios (5) 2.75:0.25:4.5:0.5 and (6) 2.5:0.5:3.8:1.2 to provide total amounts of 0.1 moles, respectively. The respective mixtures were used to prepare coating solutions following the same procedures as that in Example 1. Each coating solution was applied and fired, following the same procedures as that in Example 1, to form a rare earth-iron-garnet film on a glass plate. The magnetic properties of each resultant film were measured using a vibration sample magnetometer (VSM). The obtained results revealed that the films obtained with the compositions (a) to (e) were in-plane magnetic films, while those obtained with the compositions (1) to (6) were vertically magnetized films.

Figure 7:
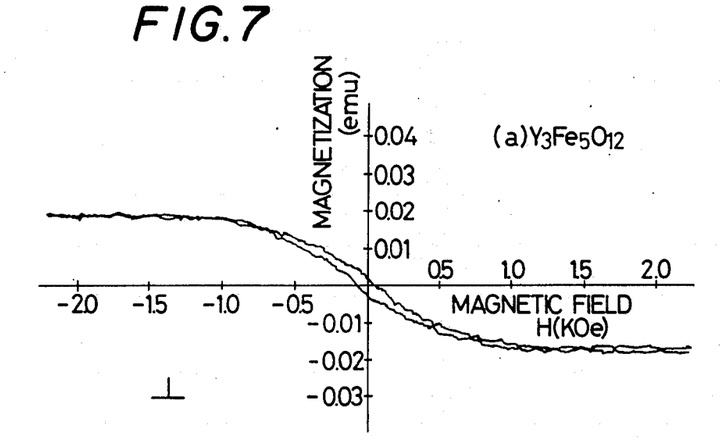
FIGS. 7 to 14 are graphs showing magnetic properties in a direction of film surface and a direction normal thereto in rare earth-iron-garnet films formed by coating solutions (a), (b), (e) and (1) in Example 7.
Figure 8:
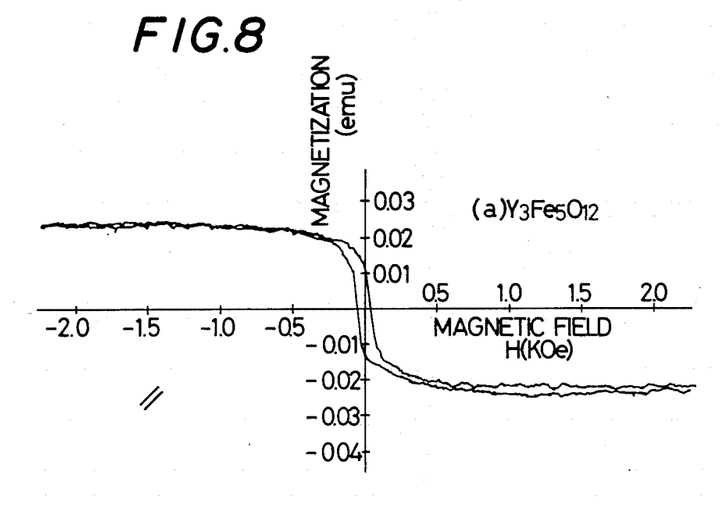
Figure 9:
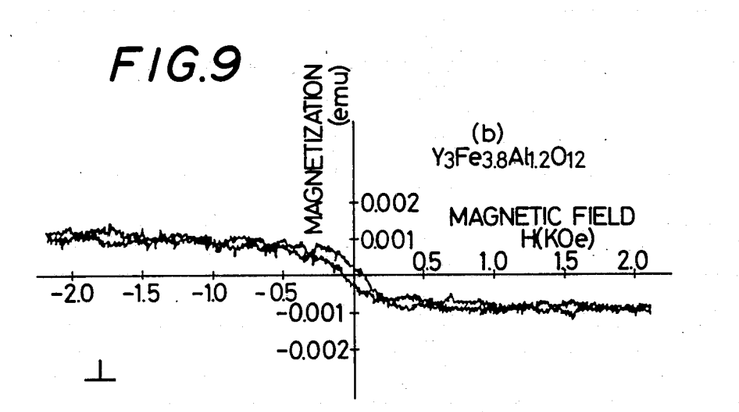
Figure 10:
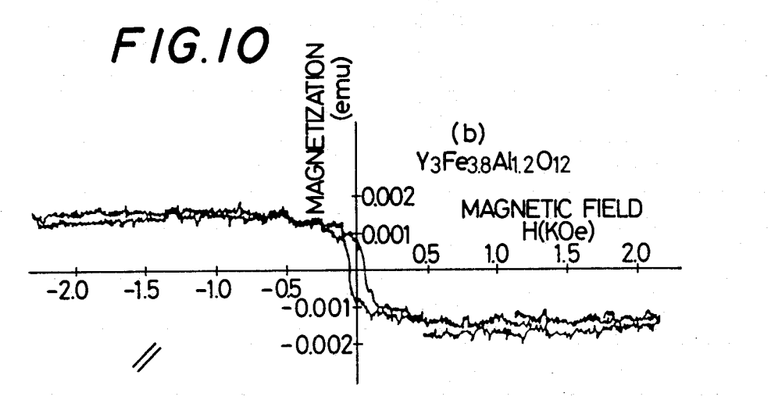
Figure 11:
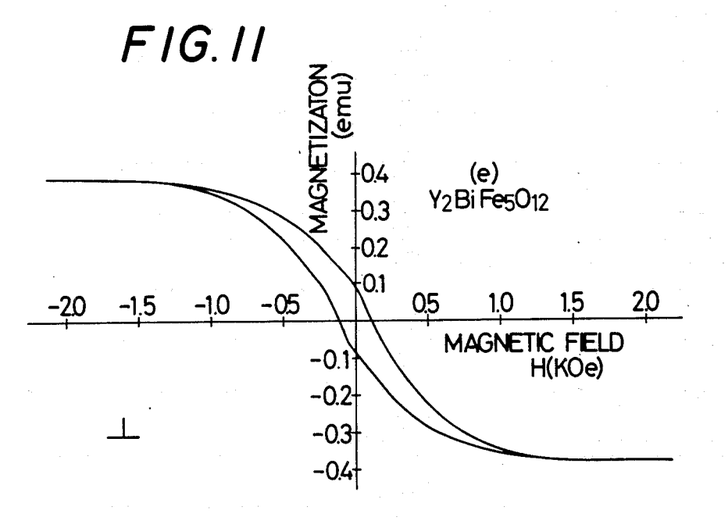
Figure 12:
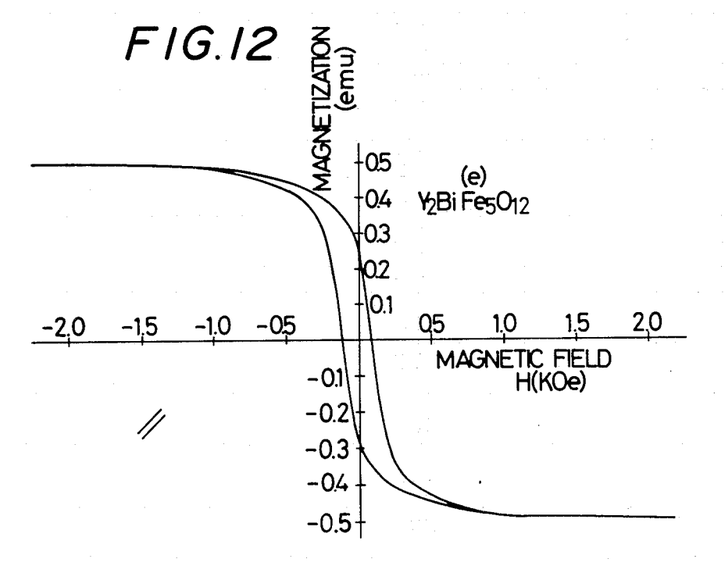
Figure 13:
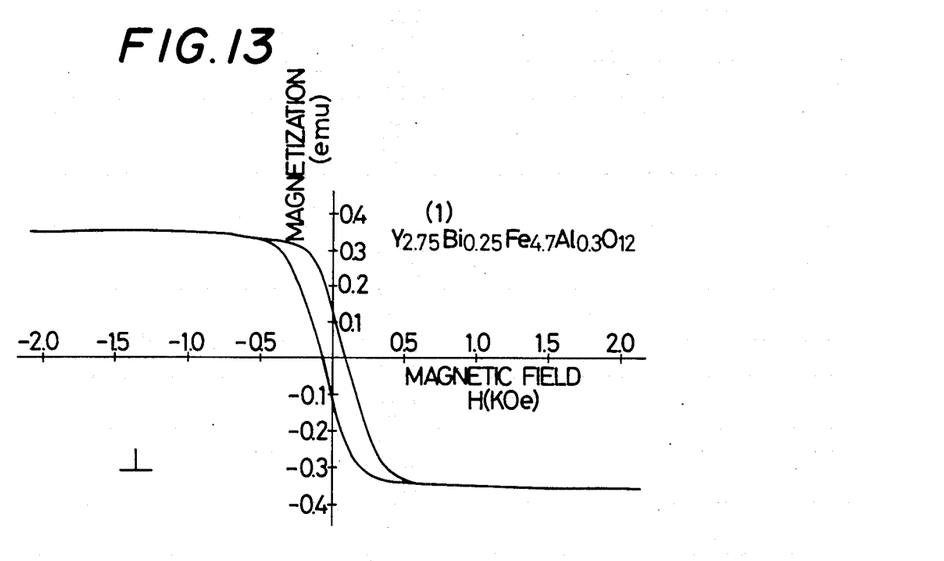
Figure 14:
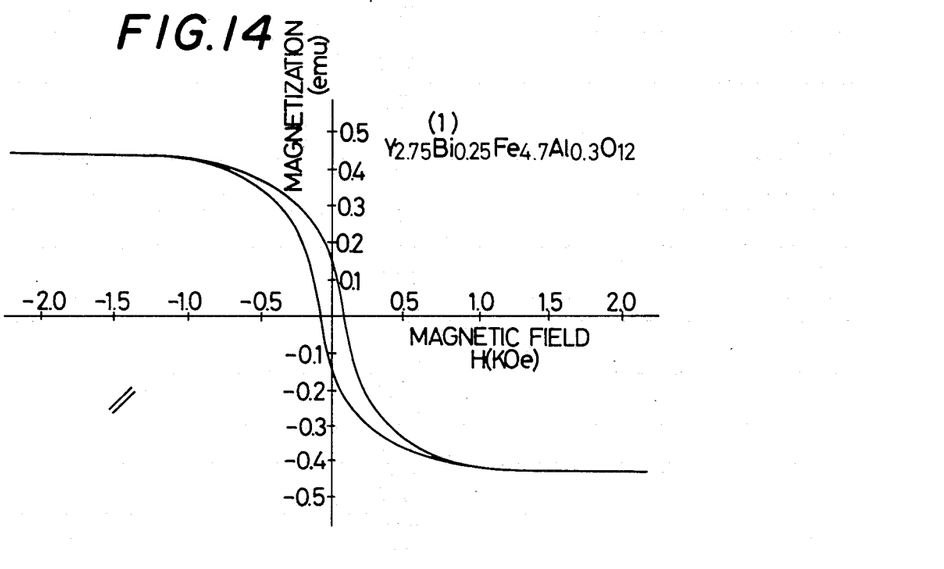

FIG. 7 shows the magnetic properties of a film obtained with the composition (a) when a magnetic field is applied in a direction normal to the film surface. FIG. 8 shows the magnetic properties in the in-plane direction of the same film. FIGS. 9 and 10 respectively show the magnetic properties of a film obtained with the composition (b) in a direction normal to the film surface and in the in-plane direction. FIGS. 11 and 12 respectively show the magnetic properties of a film obtained with the composition (e) in a direction normal to the film surface and in the in-plane direction. FIGS. 13 and 14 respectively show the magnetic properties of a film obtained with the composition (1) in a direction normal to the film surface and in the in-plane direction.

EXAMPLE 8

Ferric nitrate, yttrium nitrate, bismuth nitrate and aluminum nitrate were weighed in a molar ratio of 3.8:2.0:1.0:1.2 to provide a total amount of 0.1 moles. These nitrates were charged into a beaker and distilled water was added to provide a total amount of 50 ml. After adding 50 ml of concentrated nitric acid, the solution was heated to completely dissolve the nitrates and was thereafter cooled. The resultant solution having the nitrate concentration of 1 mole/l was provided as a coating solution, and applying and firing of the solution were performed following the procedures as that in Example 1.

A rare earth-iron-garnet film obtained in Example 8 had the thickness of about 300 nm after a single coating operation. It was confirmed that the film had properties equivalent to those of the film in Example 1 from the optical hysteresis characteristics of the film and the X-ray diffraction thereof. The coating solution of this Example showed little change in properties over time and was suitable for long-term storage.

What is claimed is:

1. A method of forming a rare earth-iron-garnet vertically magnetized film by applying a coating solution containing $Fe^{3+}$ and rare earth ions on an amphorous substrate to form a coating film, and firing the coating film to cause thermal decomposition and crystallization of the film to form a rare earth-iron-garnet film, wherein the coating solution contains $Bi^{3+}$ and ions substitutable for $Fe^{3+}$ in the garnet.

2. A method according to claim 1, wherein the ions which can substitute for $Fe^{3+}$ in the garnet comprise one selected from the group consisting of: at least one type of ions $A^{3+}$ selected from $Al^{3+}$, $Ga^{3+}$, $Cr^{3+}$ and $Co^{3+}$; at least one type of ions $B^{2+}$ selected from $Co^{2+}$, $Fe^{2+}$ and $Cu^{2+}$; at least one type of ions $C^{4+}$ selected from $Si^{4+}$, $Ge^{4+}$, $Sn^{4+}$ and $Pb^{4+}$; and at least one type of ions $E^{5+}$ selected from $V^{5+}$ and $Nb^{5+}$.

3. A method according to claim 2, wherein in the coating solution, at least one type of ions $D^{2+}$ selected from $Pb^{2+}$, $Ca^{2+}$ and $Mg^{2+}$; the ions $A^{3+}$, $B^{2+}$, $C^{4+}$, $E^{5+}$ and $Bi^{3+}$; and the rare earth ions satisfy the following conditions:

$$(Re^{3+}) + (Bi^{3+}) + (D^{2+}) + (Fe^{3+}) + (A^{3+}) + (B^{2+}) + (C^{4+}) + (E^{5+}) = 8$$

$$4.5 \leq (Fe^{3+}) + (A^{3+}) + (B^{2+}) + (C^{4+}) + (E^{5+}) \leq 6.0$$

$$2.0 \leq (Re^{3+}) + (Bi^{3+}) + (D^{2+}) \leq 3.5$$

$$0.5 \leq (Re^{3+}) \leq 3.0$$

$$0.25 \leq (Bi^{3+}) \leq 2.5$$

$$3.0 \leq (Fe^{3+}) \leq 5.0$$

$$0.3 \leq (A^{3+}) + (B^{2+}) + (C^{4+}) + (E^{5+}) \leq 2.0$$

(where $Re^{3+}$ are rare earth ions, $(Bi^{3+})$, $(Fe^{3+})$ and the like are relative values of cations such as $Bi^{3+}$, $Fe^{3+}$ and the like contained in the coating solution).

4. A method according to claim 1, wherein the resultant coating film is a multilayered film obtained by repeatedly applying the coating solution and drying the coating film part at a temperature not higher than 400° C.

5. A method according to claim 1, wherein the coating solution is an aqueous nitrate solution in which a nitrate or nitrates are dissolved in nitric acid.

6. A method according to claim 5, wherein the concentration of all cations in the coating solution is 0.01 to 1.5 moles/l.

7. A method according to claim 1, wherein the coating solution is a mixture consisting of an aqueous solution and an organic solvent solution.

8. A method according to claim 7, wherein the concentration of all cations in the coating solution is 0.01 to 0.7 moles/l.

9. A method according to claim 1, wherein the firing temperature is 400° to 800° C.

* * * * *